Feb. 14, 1933. H. L. WILKINS 1,897,744
PULVERIZER
Filed July 14, 1930
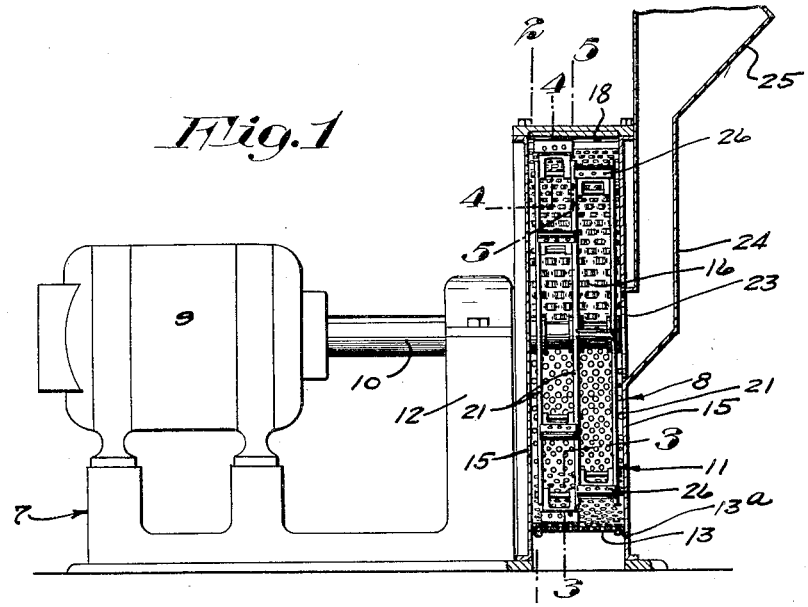
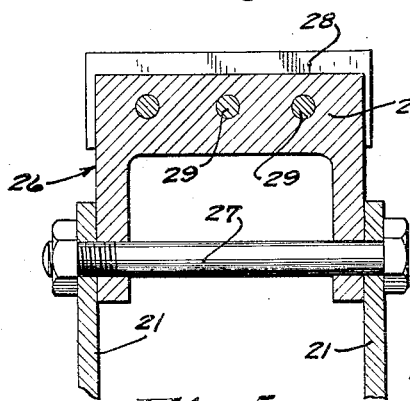
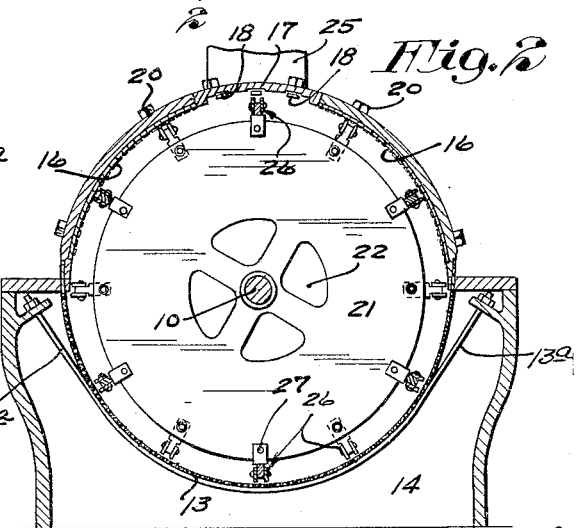
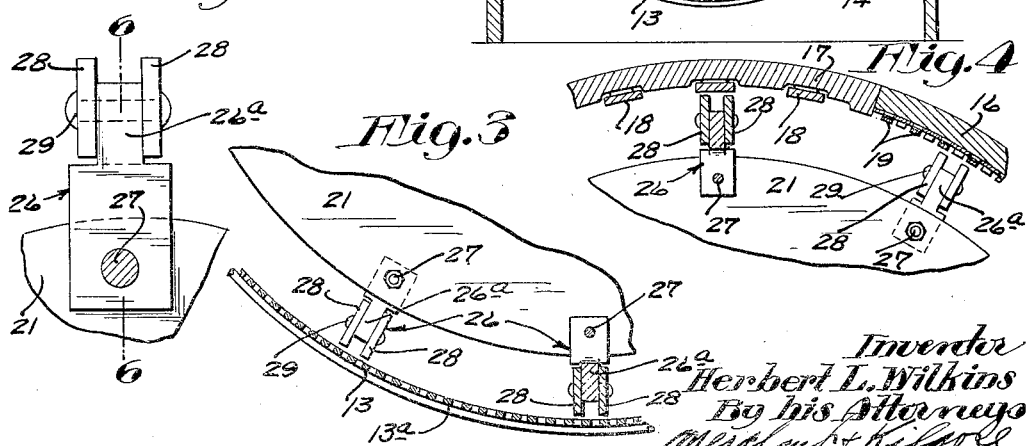
Inventor
Herbert L. Wilkins
By his Attorneys Patented Feb. 14, 1933

1,897,744

UNITED STATES PATENT OFFICE

HERBERT L. WILKINS, OF MINNEAPOLIS, MINNESOTA, ASSIGNOR TO ARCHER DANIELS MIDLAND COMPANY, OF MINNEAPOLIS, MINNESOTA, A CORPORATION OF DELAWARE

PULVERIZER

Application filed July 14, 1930. Serial No. 467,641.

This invention relates to pulverizers of the swinging hammer type and particularly to improved hammers or beaters therefor and has for its main object to reduce the cost of maintenance of such machines. This and other objects will be more clearly brought out in the following specification and claims.

Generally stated, the invention consists of the novel devices and combinations of devices, hereinafter described and defined in the claims.

In the accompanying drawing which illustrates the invention, like characters indicate like parts throughout the several views.

Referring to the drawing:

Fig. 1 is a view of the machine, partly in axial section and partly in side elevation;

Fig. 2 is a sectional view taken on the line 2—2 of Fig. 1, some parts being broken away;

Fig. 3 is an enlarged fragmentary section taken on the line 3—3 of Fig. 1;

Fig. 4 is an enlarged fragmentary section taken on the line 4—4 of Fig. 1;

Fig. 5 is an enlarged end view of one of the beaters taken on the section line 5—5 of Fig. 1 and showing a fragment of the rotary beater head; and Fig. 6 is a section taken on the line 6—6 of Fig. 5.

The machine, here illustrated, with the exception of my novel beaters or hammers, is of well known commercial form and includes a cast mounting base 7, a cylindrical pulverizing cage 8, and an electric motor 9 having its rotor shaft 10 extending axially into the pulverizing drum 8. Mounted on the extended end portion of the shaft 10 to rotate therewith within the cylindrical cage 8 is a beater head 11. The shaft 10 is journaled intermediate of the motor and beater head 11 in the upper end portion of a bearing bracket 12 that projects upward from the base 7.

The lower cylindrical portion of the cage 8 is formed by a perforated sheet metal screen 13 that is detachably retained in position within a hopper 14 by means of straps or the like 13a. The end portions of the hopper 14 are formed as part of the base 7 and the sides of said hopper are formed by plates 15 that close the opposite ends for the pulverizing drum 8. The upper cylindrical portions of the cage 8 are formed by removable segmental cutting plates 16 and a segmental cutting bar retaining plate 17 that carries cutting bars 18. The cutting plates 16 are formed with internal cutting surfaces 19. The segmental cutting plates 16 and 18 and segmental cutting bar retaining plates 17 are detachably maintained in position in the usual manner by bolts or the like 20 and may be removed for replacement when worn or for the purpose of inspecting or repairing parts within the cage 8.

The beater head 11 comprises a plurality of axially spaced discs 21 mounted for common movements on the shaft 10. These discs 21 are provided near their hub portions with a plurality of inlet openings 22 that are aligned with an opening 23 in the outer end plate 15 of the grinding cage and which opening 23 is arranged to receive material to be pulverized from a delivery pipe 24 of a hopper or the like 25.

My improved hammers or beaters, which are of the swinging type, are indicated as entireties by the numeral 26 and each comprises a main body 26a that is pivoted at its inner end portion between two of the spaced beater head discs 11 on a nut-equipped bolt or the like 27, and laterally spaced beater shoes 28 that are removably secured to the free end portions of the main bodies 26a by rivets or the like 29. These beaters 26 are, as illustrated, arranged around the periphery of the beater head in a common manner to wit: in two circumferentially spaced series. There is one series pivoted between the center beater head disc 21 and each of the outer discs 21. Of course, the size, arrangement of and number of hammers or beaters employed will be varied in different machines to meet various requirements.

The beater shoes 28 are in the form of heavy strips of steel preferably case hardened to make the same exceptionally durable and said shoes extend longitudinally to the axis of their pivot points and the axis of the beater 11. By special reference to Figs. 5 and 6, it will be noted that the shoes 28 are slightly longer and extend beyond the axial ends of the main bodies 26ª of the beaters and radially outwardly beyond the greatest radially extended portion of the beater main bodies, so that the shoes 28, at all times take the wear and thereby leave the said main body portions substantially undamaged. Also, by reference to Fig. 6, it will be noted that the main body portions 26ª of the beaters are preferably cut away below the shoes 28 so that they are substantially U-shaped in longitudinal axial cross-section so as to make the beaters relatively light especially near their pivot points, at which points the weight thereof is of little benefit and relatively heavy at their free ends. Another important feature is that the rivet holes in the shoes 28 are in their longitudinal centers thereof so that by removing the rivets the shoes may be turned over when they become worn on one edge and a new edge presented.

Operation

While pulverizing machines of the general character illustrated may be used for pulverizing or reducing a great variety of materials, they are generally used for grinding corn, oats, screenings, bran, wheat and so forth, into animal feeds and for the purpose of illustration, the machine will be assumed to be used for such. When the motor 9 is put into operation, the beater head 11 will rotate at high velocity and the beaters or hammers 26 will be thrown outward by centrifugal force so that the outer edges of their shoes 28 nearly but not quite engage the cutting surfaces 19 of the plates 16, cutting bars 18 and the segmental screen 13. The beater head 11 with its beaters 26, near the periphery thereof, will now act more or less as a centrifugal blower and will draw air through the delivery pipe or spout 24 and hopper 25 through the opening 23 in the outermost plate 15 and openings 22 near the axis of the discs 11 of the beater head and will blow the same outward through the perforated metal screen 12 and into and through the hopper 14 thereunder. Material such as grain or grain screenings to be pulverized for feed is fed through the hopper 25 and its discharge pipe 24 to the interior of the grinding cage through the opening 15 and beater head openings 22 where, by the continual impact of the beaters 26, and cooperating cutting action of the cutting surfaces 19 of the plates 16 and bars 18, will become reduced until it is of such size that it will pass through the perforated screen 13. In such a machine the size of the openings in the screen determine the fineness of the grind or the extent to which the material is reduced. It should be understood that the material will be drawn through the screen 13 by the draft of air created by the beaters as fast as it is reduced or pulverized to an extent which will permit passage thereof through the perforations in the screen.

In machines, of this character, the beaters or hammers are subject to continual impact with the material being reduced or pulverized and are, therefore, subject to great wear and as they become worn, the efficiency of the machine decreases accordingly and replacement of such worn parts is rendered necessary at quite frequent intervals. It has, in the past, been customary to so construct the beaters or hammers that when they become worn beyond the point of efficient operation, that it was necessary to replace such beaters as an entirety. This method is, of course, very expensive and due to the frequency of such changes or replacement, has rendered the cost of maintenance of the machine quite high.

By employing my improved beaters the cost of maintenance of such machines is very materially reduced because shoes 28 are the only portions thereof subject to material wear, and these shoes may be readily removed from the main bodies when they become worn on their outer portions adjacent to the cylindrical inside of the cage 8 and may be turned over so that a new wearing surface is presented. In this manner the life or the total length of service of each beater shoe is doubled. Also, the beater shoes 28 are very inexpensive and when both sides thereof have been worn beyond the point of efficient service, they may be replaced at a minimum cost. It is also important that the beater shoes 28, due to their substantial character may be made very hard without danger of breakage.

What I claim is:

1. In a pulverizing machine, the combination with a rotary beater head arranged to rotate within a cylindrical surface, of a beater comprising a main body connected to swing from the peripherial portion of the beater head, and a pair of laterally spaced shoes rigidly carried by the free end portion of the main body with their longitudinal edges disposed parallel to the axis of the rotation of the beater head.

2. In a pulverizing machine, the combination with a rotary beater head arranged to rotate within a cylindrical surface, of a beater comprising a main body connected to swing from the peripherial portion of the beater head, a pair of laterally spaced shoes carried by the free end portion of the main body with their longitudinal edges disposed parallel to the axis of rotation of the beater head, aligned holes through the shoes and main body, and means passable through said aligned holes for rigidly but removably securing said shoes to the main body.

In testimony whereof I affix my signature.

HERBERT L. WILKINS.